(12) United States Patent
Chong

(10) Patent No.: US 6,918,561 B2
(45) Date of Patent: Jul. 19, 2005

(54) SHELL ASSEMBLY FOR WINDING TIRE CORD STRIP OR BELT CORD STRIP

(76) Inventor: Yon So Chong, 133-3 Pa-Dong, Susong-Gu, Daegu (KR)

( * ) Notice: Subject to any disclaimer, the term of this patent is extended or adjusted under 35 U.S.C. 154(b) by 272 days.

(21) Appl. No.: 10/284,150

(22) Filed: Oct. 31, 2002

(65) Prior Publication Data
US 2004/0084154 A1 May 6, 2004

(51) Int. Cl.⁷ ............................................. B65H 75/00
(52) U.S. Cl. ............................. 242/609.4; 242/613.4; 242/613.5; 242/613
(58) Field of Search .................. 242/609.4, 610.4–6, 242/613.4–613.5, 613, 118.31

(56) References Cited

U.S. PATENT DOCUMENTS

| 839,189 | A | * | 12/1906 | Oberbeck | 242/609.4 |
| 1,003,593 | A | * | 9/1911 | Gammeter | 242/609.4 |
| 1,385,635 | A | * | 7/1921 | Martin | 242/609.4 |
| 1,990,860 | A | * | 2/1935 | Ellsworth | 242/609.4 |
| 2,370,066 | A | * | 2/1945 | Olson | 242/609.4 |
| 3,447,674 | A | * | 6/1969 | Fraser | 242/160.1 |
| 4,103,837 | A | * | 8/1978 | Peters | 242/46.21 |

* cited by examiner

Primary Examiner—Kathy Matecki
Assistant Examiner—Sang Kim
(74) Attorney, Agent, or Firm—Mayer, Brown, Rowe & Maw LLP

(57) ABSTRACT

A sell assembly for winding cord strip which is used in manufacturing industrial belts. The shell assembly includes a core body including a reinforcing portion configured in such a manner that each of flanges is attached to either end of a square pipe made of metal by means of welding, corner reinforcing members (1a) formed at four corners of the square pipe to which the flanges are attached, and reinforcing fins attached between the corner reinforcing members, wherein each of the outer ends of the reinforcing fins is attached to the inner sides of the flanges by means of welding.

4 Claims, 4 Drawing Sheets

SHELL ASSEMBLY FOR WINDING TIRE CORD STRIP OR BELT CORD STRIP

BACKGROUND OF THE INVENTION

1. Field of the Invention

The present invention relates to a shell assembly for winding tire cord strip which is used in manufacturing tires for automobiles or belt cord strip which is used in manufacturing industrial belts, such as V-belts, conveyor belts, etc.

2. Description of the Prior Art

Since tires for automobiles can bear air pressure and absorb any impact, the frame portions of the tires are provided with cord strip formed of fabrics, such as rayon, nylon, polyester, etc., coated with rubbers of good quality, which is folded over and over again to form outer wall structures. For manufacturing industrial belts, provided is cord strip formed of fabrics, such as rayon, nylon, etc., coated with rubbers of good quality, which is folded over and over again so as to increase tension and durability.

Accordingly, in manufacturing the tires or the belts, cord strip, which is material for the tires or the belts, is prepared first of all. Since the cord strip is wound on a shell assembly for winding the cord strip, the shell assembly must provide solidity and elasticity as compared to a shell assembly for winding the usual fabrics. Furthermore, it is required that the shaft member is strong and the square holes at both sides of the shell assembly are arranged in a straight line with each other.

To this end, the conventional shell assembly is made of cylindrical solid wood with square hole for a shaft formed at the center thereof.

However, since the shell assembly is made of a natural wood, a large number of process are required along with special treatment from selection of the material to manufacturing the material, resulting in increase of the costs. Also, since the shell assembly is made of a natural wood, it is very heavy and transformed depending on the change of the external environment, and therefore the uniformity of the quality is not guaranteed.

In order to overcome these drawbacks, the applicant of the present application has developed an improved shell assembly for winding tire cord strip or belt cord strip, which is disclosed by Korean Patent No. 351,176.

According to the aforesaid patent, the shell assembly for winding tire cord strip or belt cord strip comprises: a cylindrical pipe member made of metal or plastic; a core body including a square pipe made of metal, a tapered square pipe body formed with reinforcing ribs at the edges thereof on both sides of the square pipe, and flanges attached to the ends of the tapered square pipe body, said cylindrical pipe member and said core body constituting a shaft member; and a paper layer formed on the surface of the pipe member at a fixed thickness, so that solidity and durability of the shell assembly can be obtained.

The shell assembly as mentioned above is of good quality; however, the cost required for manufacturing the shell assembly becomes high, and the weight itself may be over 40 Kg due to formation of thick paper layers, so that it may not be convenient to handle the shell assembly.

SUMMARY OF THE INVENTION

Accordingly, it is an object of the present invention is to provide a shell assembly for winding the tire cord strip or belt cord strip which eliminates the aforementioned drawbacks and which is manufactured economically, wherein the shell assembly is relatively light while it has excellent durability.

BRIEF DESCRIPTION OF THE DRAWINGS

The preferred embodiments of the present invention will now be described by way of example with reference to the accompanying drawings in which.

DETAILED DESCRIPTION OF THE PREFERRED EMBODIMENT

Figure 1:
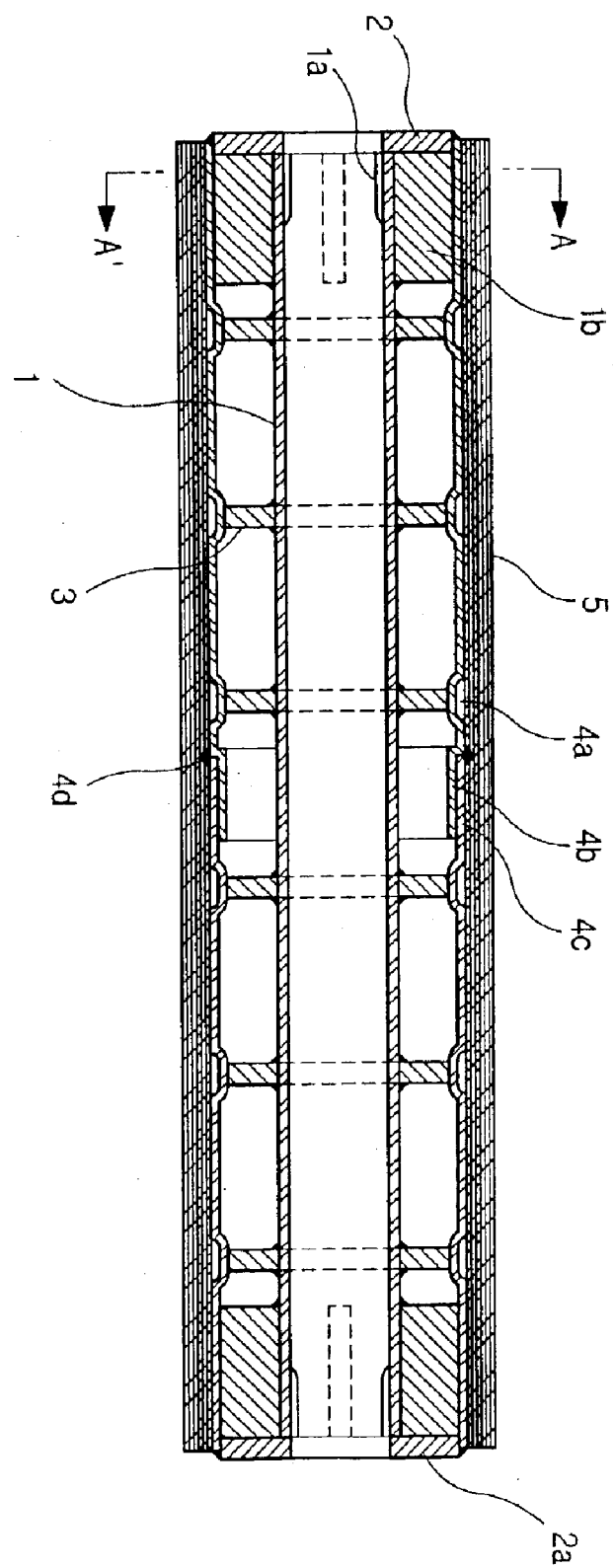
FIG. 1 is a cross sectional view of a shell assembly for winding tire cord strip or belt cord strip according to the present invention.
Figure 2:
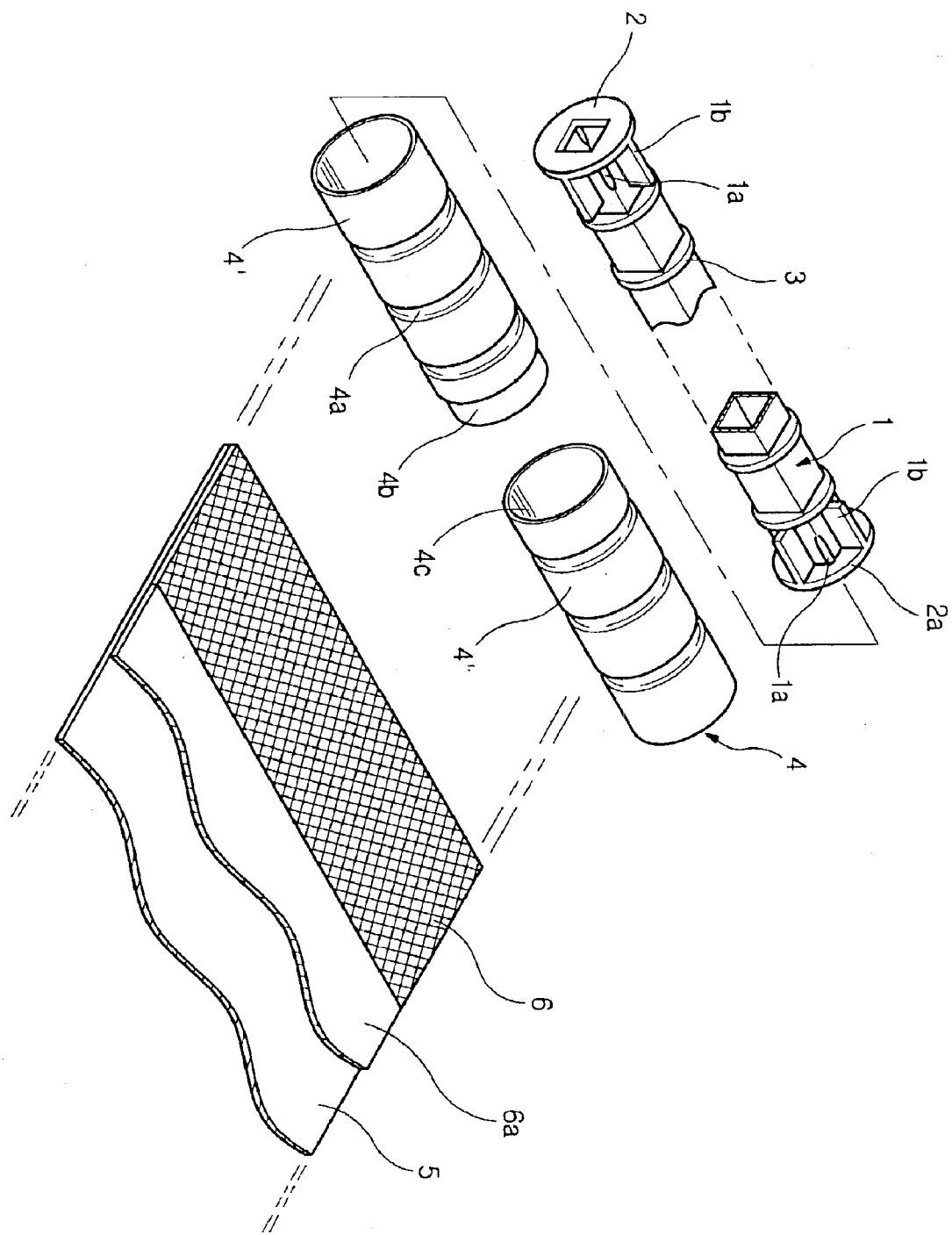
FIG. 2 is an exploded perspective view, partially cut away, of the shell assembly for winding tire cord strip or belt cord strip according to the present invention.
Figure 3:
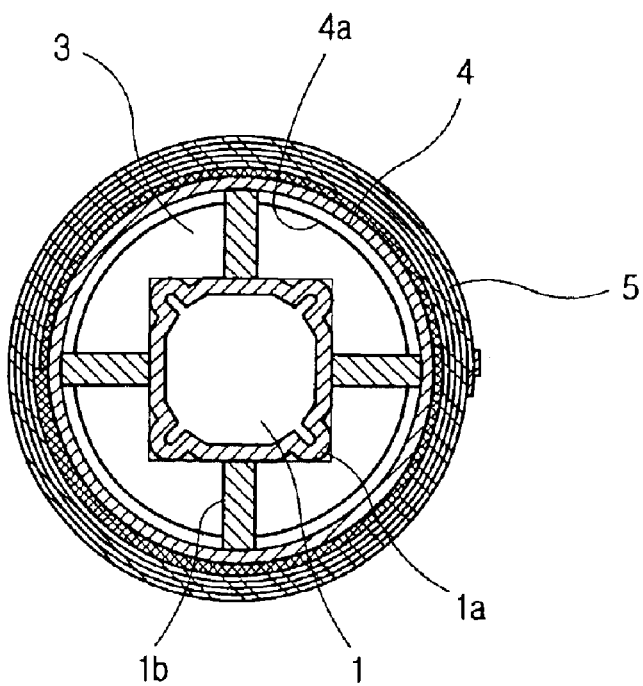
FIG. 3 is a cross sectional view taken along the line A–A' of FIG. 1.
Figure 4:
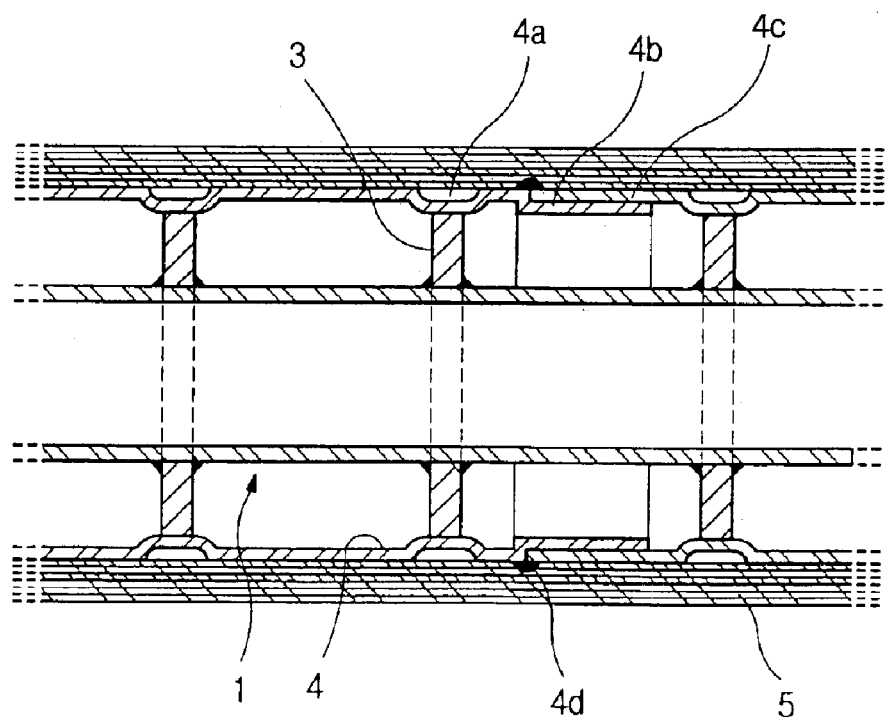
FIG. 4 is an enlarged cross sectional view of a reinforced cylinder according to the present invention.
Figure 5:
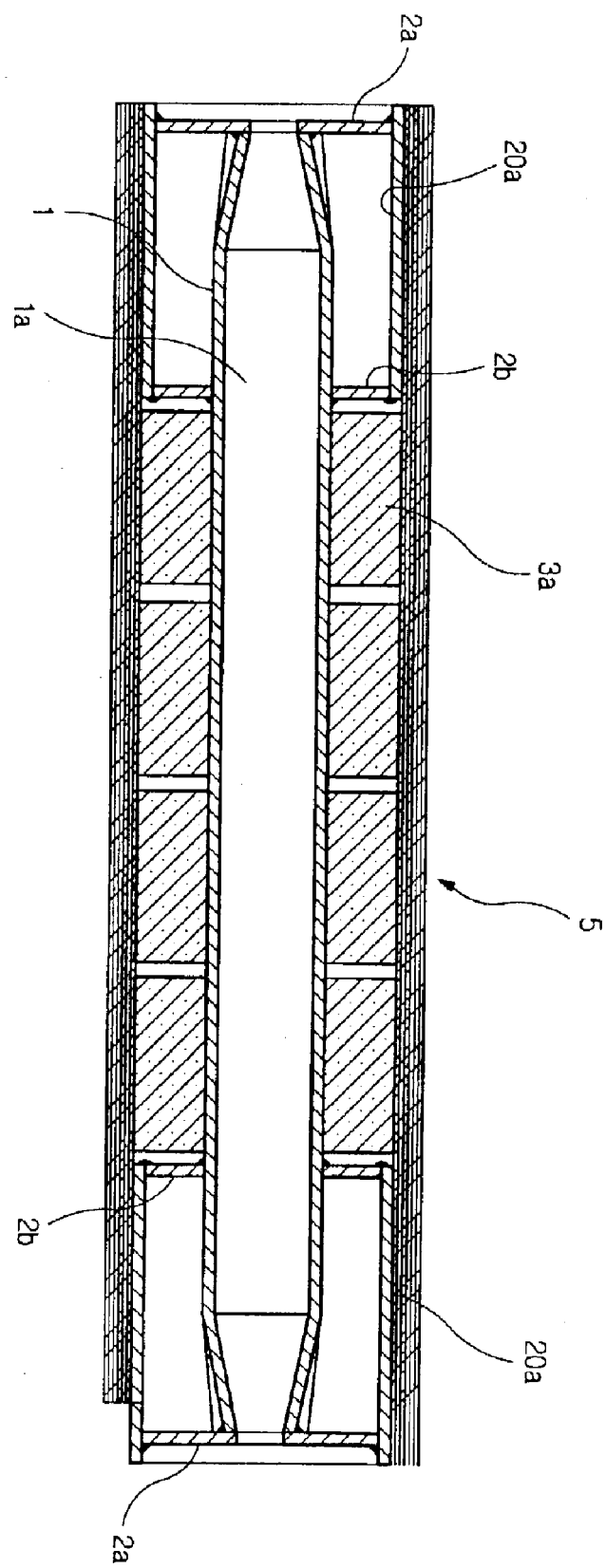
FIG. 5 is an illustrational view of another embodiment of the shell assembly for winding tire cord strip or belt cord strip according to the present invention.

A shell assembly for winding tire cord strip or belt cord strip according to the present invention comprises: a core body 1 including a reinforcing portion configured in such a manner that each of circular flanges 2 and 2a is attached to either end of a square pipe made of metal by means of welding, corner reinforcing members 1a are formed at four corners of the square pipe to which the flanges are attached, and reinforcing fins 1b are attached between the corner reinforcing members, each of the outer ends of the reinforcing fins is attached to the inner sides of the flanges 2 and 2a by means of welding, or a reinforcing portion configured in such a manner that two flanges 2a and 2b are attached to either end of the square pipe by means of welding, and the square pipe is inserted into a cylindrical member 20a, the square pipe and the cylindrical member being attached to each other by means of welding, and a plurality of reinforcing discs 3 attached at regular intervals to the outer surface of the square pipe or a reinforcing member 3a made of synthetic resin, the reinforcing member being attached at regular intervals to the outer surface of the square pipe; and a cylindrical body 4 composed of metal cylinder parts 4' and 4", the cylindrical body including a reinforcing portion 4a formed at regular intervals on the outer circumference of the metal cylinders in the form of ring-shaped groove, connecting portions 4b and 4c formed at the middle of the cylindrical body, the overlapped connecting portions being fixed to each other by means of welding 4d, wherein the core body 1 is inserted into the cylindrical body 4, the flanges 2 and 2a are attached to the both ends of the cylindrical body 4 by means of welding, the reinforcing discs 3 are in contact with the reinforcing portions 4a of the cylindrical body 4, and a well-known paper layer 5 is applied to the surface of the cylindrical body 4.

In a preferred embodiment, a water-soluble bonding agent or a synthetic resin bonding agent may be used conveniently as a bonding agent used for forming the paper layer, because the paper is contracted as the moisture is evaporated, and then an compressive force acts on the cylindrical body 4 toward the center of the cylindrical body so as to form the solid paper layer 5.

However, it is preferable that the paper of the paper layer is attached to the cylindrical body by means of sticky adhesive 6 at the position where the cylindrical body and the paper are joined with each other for the first time, so as to maintain the viscosity and the elasticity of the adhesive. As a result, adhesion without slip is obtained between the paper and the cylindrical body.

In a preferred embodiment, the adhesive may be natural or synthetic latex of high sticky property or pressure sensitive adhesive of acrylic ester copolymer emulsion type, which helps complete clothing.

Also, the bonding agent 6a applied on the cylindrical body subsequent to the sticky adhesive may be a water-soluble bonding agent or a synthetic resin bonding agent, which is used to bond the paper with each other. To this bonding agent are added chemicals, such as antiseptic, waterproof agent, insecticide, etc., to obtain the effects of preventing against putrefaction, waterproofing, preventing against insect, etc.

According to the present invention, the sticky adhesive is applied on the end of the paper such that the end of the paper on which the adhesive is applied is wound on the cylindrical body for several turns. Subsequently, the end of the paper on which the sticky adhesive is applied is attached to the surface of the cylindrical body, and then the paper is wound on the cylindrical body while the cylindrical body is rotated for several turns. Finally, the end of the paper is attached to the surface of the cylindrical body by fixing means.

After the sticky adhesive has been applied, the bonding agent is continuously applied inward from the end of applied adhesive. The cylindrical body is rotated while the paper is drawn, so as to wind the rest of the paper. As a result, the paper layer 5 is wound on the surface of the cylindrical body 4 by the thickness of 1.5 to 3 cm.

Description will be made more concretely as to the core body 1. The corner reinforcing members la are formed at four corners of the square pipe in the longitudinal direction, and the reinforcing fins 1b are attached between the corner reinforcing members in the radial direction. Each of the outer ends of the reinforcing fins is attached to the inner sides of the flanges 2 and 2a, which are attached to the both ends of the core body, by means of welding.

After the cylindrical body 4 is arranged between the two flanges, the both ends of the cylindrical body is welded around the flanges 2 and 2a. The reinforcing portions 4a formed on the outer circumference of the cylindrical body 4 in the form of ring-shaped groove is in contact with the reinforcing discs 3 attached to the core body 1. Consequently, the connection between the core body and the flanges 2 and 2a is secured, and at the same time the connection between the core body 1 and the cylindrical body 4 is secured. As a result, the light and strong shell assembly can be obtained.

In a preferred embodiment, the diameter of the shell assembly according to the present invention is between 17 and 20 cm, which is longer than that of the conventional shell assembly, and the length of the shell assembly according to the present invention is between 120 and 180 cm.

Furthermore, two flanges are attached to either end of the square pipe at intervals of 20 cm by means of welding, and the cylindrical members 20a are placed on the outer surfaces of the flanges. The cylindrical members are attached to the flanges by means of welding, and the reinforcing members 3a made of synthetic resin are arranged on the surface of the square pipe. With such a structure as mentioned, the paper layer can be formed directly on the core body without the cylindrical body.

According to the sell assembly for winding tire cord strip or belt cord strip according to the present invention as described above, the sticky adhesive and the bonding agent are used separately when the paper layer is formed on the surface of the cylindrical body, so that no slip occurs when the paper layer is formed on the surface of the cylindrical body, and thus it is possible to prevent any slip between the shaft member and the paper layer essentially. Moreover, the diameter of the cylindrical body is limited to the range of 17 to 20 cm, so as to reduce the thickness of the wound paper below 3 cm, so that the light and large shell assembly can be obtained.

According to the present invention, when the core body and the cylindrical body, which constitute the shell assembly together, are combined, the both ends and the middle part of the core body are reinforced by the reinforcing members, which are welded to the cylindrical body. As a result, the light, durable winding shell assembly with good cushion can be manufactured economically. At the same time, since the reinforcing portions comprising the corner reinforcing members and the reinforcing fins are provided at the position where the flanges and the both ends of the square pipe, which constitute the core body, are attached by means of welding, any external force applied to the cylindrical body may be accommodated satisfactorily and relieved while the attachment of the flanges is maintained. As a result, safe use of the shell assembly is possible, any deformation of the shell assembly can be prevented, and any damage of the core body can be prevented to the maximum.

Furthermore, since the cylinders 4' and 4", which constitute the cylindrical body together, are made with the length of 60 to 100 cm, and the cylinders are connected with each other at the middle of the cylindrical body, the cylinders being welded to each other, the cylinders can be manufactured easily and economically, and the circular state of the cylindrical body is maintained.

Besides, since the chemicals, such as antiseptic, waterproof agent, insecticide, etc. are added in the bonding agent when the paper is bonded, the shell assembly according to the present invention provides the effects of preventing against putrefaction, waterproofing, preventing against insect, etc. during the international distribution of the shell assembly.

Moreover, since two flanges are attached to either end of the square pipe 1, with which the core body is manufactured, at intervals of 20 cm by means of welding, the cylindrical members 20a are placed on the outer surfaces of the flanges, and the cylindrical members are attached to the flanges by means of welding, the core body having the cylindrical reinforcing portions at the both ends of the square pipe can be manufactured. With this core body, the paper layer is applied directly to the surface of the core body without the cylindrical body. As a result, more lightened shell assembly can be manufactured. In addition, more durable shell assembly with light weight and large diameter can be manufactured.

What is claimed is:

1. A shell assembly for winding tire cord strip or belt cord strip, comprising:
   a core body including a reinforcing portion configured in such a manner that circular flanges are attached to either end of a square pipe by means of welding, said square pipe being made of metal;
   corner reinforcing members formed at four corners of the square pipe to which the flanges are attached, and reinforcing fins being attached between the corner reinforcing members, wherein each of the outer ends of the reinforcing fins is attached to the inner sides of the circular flanges by means of welding;

a plurality of reinforcing discs attached at regular intervals to the outer surface of the square pipe; and a cylindrical body composed of first and second metal cylinder parts, the cylindrical body including a reinforcing portion formed at regular intervals on the outer circumference of the metal cylinders in the form of a ring-shaped groove, wherein an overlapping connecting portion is formed at an end of each of the first and second cylinder parts, the overlapped connecting portions being fixed to each other by means of welding, wherein the core body is inserted into the cylindrical body, the circular flanges are attached to the both ends of the cylindrical body by means of welding, the reinforcing discs are in contact with the reinforcing portions of the cylindrical body, and a paper layer is applied to the surface of the cylindrical body to a thickness of below 3 cm.

2. The shell assembly for winding tire cord strip or belt cord strip as claimed in claim 1, wherein the diameter of the cylindrical body is between 17 and 20 cm.

3. The shell assembly for winding tire cord strip or belt cord strip as claimed in claim 1, wherein the length of the core body is between 120 and 180 cm.

4. The shell assembly for winding tire cord strip or belt cord strip as claimed in claim 1, wherein each of the cylinder parts of the cylindrical body is 60 to 100 cm long, and wherein the connecting portions are formed at the middle of the cylindrical body, and wherein the connecting portions are connected to each other by means of welding.

\* \* \* \* \*